(12) United States Patent
Erfan

(10) Patent No.: US 7,157,013 B2
(45) Date of Patent: Jan. 2, 2007

(54) FILTRATION METHOD

(76) Inventor: Mani Erfan, 207 Rolling Spring La., Dickinson, TX (US) 77539

( * ) Notice: Subject to any disclaimer, the term of this patent is extended or adjusted under 35 U.S.C. 154(b) by 0 days.

(21) Appl. No.: 10/939,762

(22) Filed: Sep. 13, 2004

(65) Prior Publication Data

US 2005/0056593 A1    Mar. 17, 2005

Related U.S. Application Data

(60) Provisional application No. 60/481,392, filed on Sep. 17, 2003.

(51) Int. Cl.
*C02F 1/68* (2006.01)
(52) U.S. Cl. .................... 210/749; 210/763; 208/65
(58) Field of Classification Search ................ 210/749, 210/763; 208/65
See application file for complete search history.

(56) References Cited

U.S. PATENT DOCUMENTS

| | | | | |
|---|---|---|---|---|
| 3,885,977 | A | * | 5/1975 | Lachman et al. ............. 501/80 |
| 3,909,452 | A | * | 9/1975 | Acres ........................... 502/65 |
| 4,420,316 | A | | 12/1983 | Frost et al. ................... 55/523 |
| 4,483,944 | A | * | 11/1984 | Day et al. .................... 502/439 |
| RE32,044 | E | * | 12/1985 | Atwood et al. ............. 502/335 |
| 4,631,267 | A | * | 12/1986 | Lachman et al. ........... 502/439 |
| 4,681,624 | A | | 7/1987 | DeAngelis et al. ............ 75/28 |
| 4,711,930 | A | * | 12/1987 | Hoelderich et al. ......... 502/209 |
| 5,070,588 | A | | 12/1991 | Miwa et al. .................. 29/407 |
| 5,281,462 | A | | 1/1994 | Day et al. .................... 428/116 |
| 5,306,457 | A | | 4/1994 | Lipp ......................... 264/177.12 |
| 5,308,568 | A | | 5/1994 | Lipp ......................... 264/177.12 |
| 5,633,217 | A | * | 5/1997 | Lynn .......................... 502/439 |
| 6,258,900 | B1 | | 7/2001 | Glover ......................... 526/67 |
| 6,291,603 | B1 | | 9/2001 | Glover ......................... 526/71 |
| 2003/0146131 | A1 | * | 8/2003 | Boger et al. ................. 208/65 |
| 2005/0056593 | A1 | | 3/2005 | Erfan ........................... 210/660 |

OTHER PUBLICATIONS

Haldor Topsoe A/S, Pressure Drop Control; pp. 1-8.
Johnson, et al., "Basket Case: Graded Catalyst Beds Solve Pressure Drop Problem in a Naphtha Hydrotreating Unit," Presented at the NPRA 2000 Annual Meeting, Mar. 26-28, 2000, San Antonio, Texas.
Isch, "Protect processing catalysts from feedstock contaminants: Effective feedstock filtration can extend service life for catalytic systems and optimize reactor performance," *Hydrocarbon Processing*, Aug. 2003, pp. 69-72.
International Search Report and Written Opinion dated May 4, 2006 for PCT/US04/30155.

* cited by examiner

*Primary Examiner*—Chester T Barry
(74) *Attorney, Agent, or Firm*—Howrey LLP

(57) ABSTRACT

A method of filtering contaminants from a chemical process stream is disclosed. The method includes a step of passing the process stream over a filtration medium including a plurality of discrete filtration elements, each element having parallel first and second faces and a multi-cellular structure of substantially uniform parallel channels running from the first face to the second face. The cross-sectional shape of the channels preferably defines a polygon having angles less than or equal to 90°.

46 Claims, 2 Drawing Sheets

FILTRATION METHOD

CROSS-REFERENCE TO RELATED APPLICATION

This application claims the benefit under 35 U.S.C. § 119(e) of U.S. Provisional Application No. 60/481,392 filed Sep. 17, 2003, the entire disclosure of which is incorporated herein by reference for all purposes.

BACKGROUND OF THE INVENTION

1. Field of the Invention

This invention relates to methods for removing contaminants by filtration from chemical process streams, such as feed streams to a chemical reactor.

2. Technical Background

Filtration of the feedstock of a chemical reactor continues to be an area of ongoing research and need. In the petroleum refining industry, significant factors are driving the need for more feedstock filtration. Examples of such factors include: changes in raw material characteristics, evolving refinery productivity goals and tighter environmental laws and regulations. Further, refiners are upgrading a greater percentage of each barrel into higher value fuel products, but at the same time they must reduce the sulfur content of fuel products. This upgrading process commonly involves the use of fixed bed catalytic reactors. Because of the high costs of the catalysts, refiners want to maximize the flow through and overall life of the fixed bed catalysts. Unfortunately fixed bed catalytic reactors are subject to reduced flow and eventual plugging because of solids, carbon deposits or large molecular weight organic materials that become deposited on or lodged within the catalysts. When this happens the catalyst must be skimmed and/or completely replaced. Feedstock filtration is a preventative action to circumvent premature catalyst bed plugging and pressure drop development.

Another area of long felt need is in the ability to filter fluids (including gases) in between stages in a multistage process. In particular, effective filtration at a high throughput with minimal pressure drop has long been a desired goal.

Attempts to achieve the above desired goals have included the use of a variety of screens, including slotted-wedge wire screens, woven wire mesh, support ceramic materials, and multilayered, sintered media. It should be appreciated that each of these methods ultimately relies upon cake filtration, in which a filter cake is accumulated over time along with increasing back pressure and decreasing flow through. Alternatively the literature reports the use of reticulated ceramic as a filtration media. Reticulated ceramic is a multi-cellular sponge-like solid material that does not have discrete fluid flow pathways. During the course of the useful life of the reticulated ceramic, the pores and fluid flow pathways become clogged and the material rapidly reverts to being a cake filtration element with high back pressure, reduced flow rate and increasing pressure drop.

Fixed-shape bed-grading and bed-topping catalysts have been commercially available since at least 1987, when Haldor Topsoe Inc. first introduced "TK-10", a press-formed cylindrical "wagon wheel" ceramic/alumina particle with 7 round holes. Other manufacturers have followed with similar products, such as Criterion 855MD (19 mm round medallion with 1 round and 4 elliptical holes), Akzo Nobel KG-50 and KG-55 (19 mm disk with five triangular channels), Catalyst Trading Co., Ltd.'s BT-500, Crystaphase BG-2000, UNICAT AOS-7H, and UNICAT UDC-1000. Nevertheless, for the reasons described above, there remains and exists an unmet need for methods of filtering fluids with high throughput, low pressure drop, and improved accuracy, especially in chemical reactors. The present disclosure describes a number of methods that fill this unmet need.

SUMMARY OF THE INVENTION

In view of the above, one of skill in the art should understand that one illustrative embodiment of the claimed subject matter includes a method of removing contaminants from a feed stream of a chemical reactor. The method includes the steps of: (a) providing a plurality of discrete elements of a filtration material upstream of the chemical reactor, each filtration element having substantially parallel first and second faces and a multi-cellular internal structure of substantially open and parallel channels extending through the filtration element from the first face to the second face; and (b) passing the feed stream through at least one layer of the filtration material, wherein the layer of filtration material contains a sufficient number of the filtration elements to filter the contaminant from the contaminated feed stream. If the chemical reactor in this embodiment is a hydrotreating reactor, the feed stream is selected from the group consisting of atmospheric residuum, vacuum residuum, diesel oil, kerosene, jet fuel, fluidized catalytic cracker feed, and hydrocracker feed. The channels of the filter elements preferably have a polygonal cross-sectional shape defined by internal angles not greater than 90 degrees. Most preferably the channels have a triangular cross section.

A second illustrative embodiment of the claimed subject matter is another method of removing contaminants from a process stream. In this second embodiment, the method includes the step of contacting the process stream with a plurality of filtration elements having substantially parallel first and second faces, an outer wall, and a multi-cellular internal structure of substantially open and parallel channels extending from the first face to the second face. The channels have a generally polygonal cross section that includes at least one angle of less than or equal to 90°. The outer wall is shaped to increase outer void area relative to a comparable filtration element having a generally round and smooth outer wall. For example, the outer wall may be polygonal with about 5 to about 10 sides, or may be round with longitudinal grooves.

Yet a third illustrative embodiment of the claimed subject matter is still another method of removing contaminants from a process stream. In this third embodiment, the method includes the step of contacting the process stream with a plurality of filtration elements having substantially parallel first and second faces, an outer wall, and a multi-cellular internal structure of substantially open and parallel channels extending from the first face to the second face. The channels have a generally polygonal cross-section that includes at least one angle of less than or equal to 90°. In this embodiment, the filtration elements are composed at least partly of a macroporous material.

A fourth embodiment of the claimed subject matter includes a method according to any of the three embodiments mentioned above, where the filtration elements also contain a catalytic material such as a transition metal oxide, a transition metal sulfide, a rare-earth metal oxide, a rare-earth metal sulfide, or a catalyst containing one or more metallic elements such as iron, cobalt, nickel, chromium, molybdenum, tungsten, osmium, iridium, platinum, ruthenium, rhodium, palladium, silver, gold, copper, zinc, calcium, potassium and combinations thereof.

These and other features of the present invention are more fully set forth in the following description of preferred or illustrative embodiments of the invention.

DESCRIPTION OF ILLUSTRATIVE EMBODIMENTS

Figure 1:
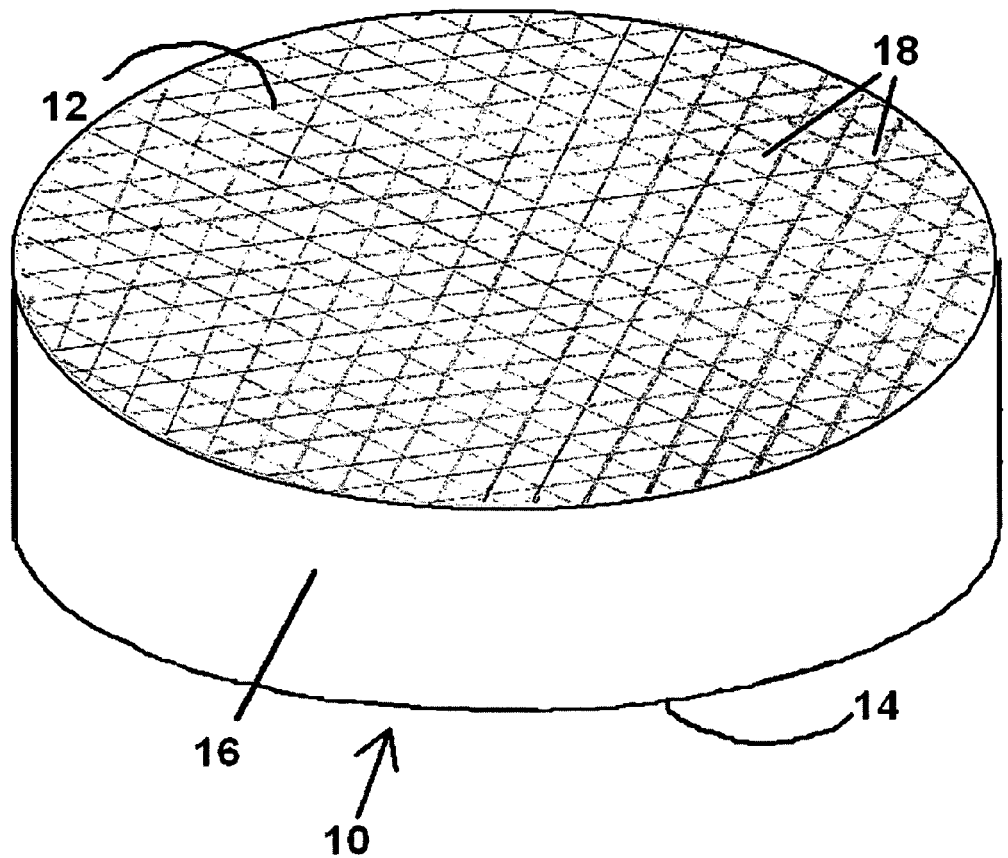
FIG. 1 depicts a disk-shaped filtration particle suitable for use in methods according to the present disclosure.

The present disclosure is generally directed to methods of filtration using a filtration material with which high throughput and low pressure drop are achieved. The filtration material is composed of a plurality of filtration elements. Each filtration element has an outer wall, substantially parallel first and second faces, and a multi-cellular internal structure of substantially open and parallel channels that extend through the filtration element from the first face to the second face. In certain embodiments, the outer wall is essentially round such that the filtration elements are substantially disk-shaped. One example of a disk-shaped filtration element is depicted in FIG. 1. As shown in the figure, filtration element 10 is defined by a top face 12, a bottom face 14, and an outer edge 16. A large number of substantially parallel and generally uniform channels 18 run through filtration element 10 from top face 12 to bottom face 14.

Figure 2:
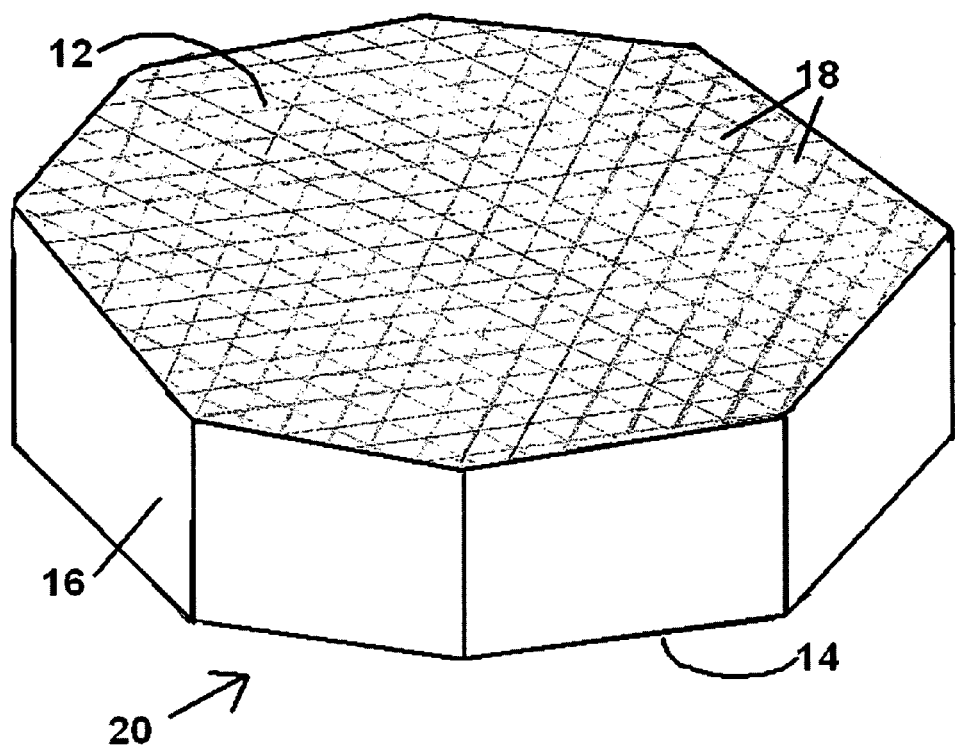
FIG. 2 depicts an octagonal filtration particle suitable for use in methods according to the present disclosure.

In other embodiments, the outer wall is configured to provide increased external void volume relative to disk-shaped filtration elements. For example, the outer wall may be polygonal with about 5 to about 10 sides, or may be round with longitudinal grooves. FIG. 2 depicts one example of a polygonal filtration element 20 having eight sides.

In the various illustrative embodiments disclosed herein the substantially open and parallel channels may have a polygonal cross-sectional shape, wherein the polygon is defined by internal angles not greater than 90 degrees and preferably the substantially open and parallel channels have an acute angle polygonal cross-sectional shape. Examples of suitable channel shapes are triangles, squares and rectangles. Triangular channels are preferred.

It should be further noted that the substantially open and parallel channels can occupy from about 4 cells per linear inch to about 60 cells per linear inch.

Without being bound by any particular theory, it is presently believed that in the filtration technology disclosed herein, each triangular void creates and or acts as an individual filter in which the filter creates a circumferential flow effect pushing the particulate content of the feed into the sides of the triangle. The sharp corners of the triangle act as pinch or entrapment points to hold on to the specific particle. Different particle sizes may be selected for retention simply by changing the size of the triangles.

For example, the applicant has found the following relationship between the mesh size of the filtration element and the particle size for maximum filtration efficiency:

| Mesh size | Particle Size for Maximum Filtration Efficiency |
|---|---|
| 6 | >1200 microns |
| 10 | >800 microns |
| 25 | 100–800 microns |
| 50 | 10–100 microns |

As the filter continues to operate, the particles create a buildup within the inside walls of each triangular channel. Eventually this buildup creates a "laminar" filtration effect—that is, the contact of articles over a flat area of residue buildup results in the removal of the particle by the built-up region of particles itself acting as a filter. Applicant has found that the filtration elements can retain up to 150% by weight of particles.

Thus, it will be apparent to those of skill in the art that the principal methodology of filtration according to the present disclosure is significantly different than reticulated ceramics such as those mentioned hereinabove and described in various prior art references. While reticulated ceramics use non-uniform flow pathways (that is, each pathway is unique and is not designed in a specific duplicable shape) to create tortuous pathways than force the particle to contact enough surface area to drop out, the present filtration materials employ numerous specifically shaped, uniform and identical pathways that create a circumferential turbulent flow within each pathway. The methods of manufacturing reticulated ceramics also differ significantly from the manufacturing methods suitable for making filtration materials according to the present disclosure. As is known by those of skill in the art, reticulated ceramics are produced by blowing air through molten alumina or similar material to produce a foam, then instantaneously cooling the foam to preserve the spongy texture. By way of distinction, filtration materials according to the present disclosure are typically produced by extruding a paste of the alumina through a fixed-shape extruder die and then calcining the extrudate to fix and harden the shape. If necessary the extrudate may be worked after calcining to provide a desired edge configuration.

In the above methods, the filtration element can have an outer diameter from about ½ inch to about 3 inches and a height (i.e. thickness) of about ¼ inch to about 2 inches. Alternatively, the filtration element can have a geometric surface area from about 25 to about 175 square inches. One of skill in the art should appreciate that the filtration element can have an inner void fraction of about 60 percent to about 80 percent. The filtration elements typically have a face crush strength in excess of 600 pounds of force and a side crush strength of 220–350 pounds of force.

The filtration elements may be used under a wide range of operating conditions. For example, the filtration elements can operate at a gas space velocity of about 10–12000 scfh$^{-1}$, with the greatest efficiency being observed at 500–2000 scfh$^{-1}$. The filtration elements can operate at a liquid space velocity of 0.1 to 50 hr$^{-1}$ and are most efficient at 0.5–5 hr$^{-1}$. Depending on the material of the filtration element, the element may be used over a broad range of temperatures and pH values. Applicant has found that standard alumina elements are operable up to about 900° F. and over a pH range of 3 to 10; high purity alumina elements increase the operating temperature to about 2000° F. and permit the pH to range from about 2 to about 12.

In one illustrative embodiment of the claimed subject matter, the filtration element may be composed of shaped material selected from: alumina, silica, calcium aluminate, lanthanum aluminate, magnesium aluminate; zeolite, activated carbon, and combinations and mixtures of these and similar materials that are known to those of skill in the art. In another preferred and illustrative embodiment, the filtration element is formed from an extruded ceramic material, preferably alumina, silica or a mixture of these. Further it has been found that the filtration elements can also be composed of or contain a catalytic material preferably selected from the group consisting of: transition metal oxides, transition metal sulfides, organo-transition metal compounds; rare earth metal oxides, rare earth metal sulfides; and combinations thereof. One of skill in the art should appreciate that of particular note are catalytic materials containing a metallic element such as iron, cobalt, nickel, chromium, molybdenum, tungsten, ruthenium, rhodium, palladium, osmium, iridium, platinum, silver, gold, copper, zinc, calcium, potassium, as well as combinations and mixtures of these and others that should be well known to those of skill in the art.

In view of the above disclosure, one of ordinary skill in the art should understand and appreciate that the filtration materials disclosed herein may be used in a wide variety of applications as set forth in the following examples, which are illustrative only and are not intended to limit the disclosure in any way.

EXAMPLE 1

In a high temperature water-gas shift reactor, water and carbon monoxide are reacted to form carbon dioxide and hydrogen. Boiler leaks in the feed to such a reactor could contaminate the shift catalyst with liquid water, which significantly affects catalyst performance. In addition, water from boiler leaks ordinarily contains a number of additional contaminants that can poison the catalyst. To prevent this occurrence, a layer of filtration material according to the present invention is interposed between the boiler and the shift catalyst to trap liquid water that might be entrained in the gas stream. A particularly suitable filtration material for this application is 6 to 24 inches of 25 mesh material with outer grooves for increased void fraction and improved trapping.

EXAMPLE 2

The removal of contaminants is particularly important where the shift reactor is used to increase the hydrogen content of syngas produced by coal gasification. The sulfur-tolerant "sour shift" catalyst used in this process can be fouled by fine coal particles ("soot") entrained in the gas stream. Filtration materials according to the present disclosure are well suited for use in soot scrubbers upstream of the sour shift catalyst. A particularly suitable filtration material for this application is 6 to 24 inches of 25 mesh material with grooves in the outer edges for increased void fraction and improved trapping.

EXAMPLE 3

Excess water is likewise a potential catalyst poison in low-temperature water-gas shift reactors that may be found in hydrogen and ammonia plants. Accordingly, these reactors may also be protected from liquid water contamination by interposing a layer of filtration material upstream of the shift catalyst to prevent liquid water from reaching the catalyst.

EXAMPLE 4

In hydrotreating reactors, a hydrocarbon feed such as resid, gas oil, diesel, kerosene or naphtha is treated with hydrogen to eliminate unsaturated compounds such as olefins and aromatics. In some cases, the hydrotreating step also removes sulfur and nitrogen containing compounds. Under particular process and catalyst conditions, high molecular weight hydrocarbons such as those in vacuum distillate can also be reacted with hydrogen to convert them to lighter, higher value products such as gasoline and diesel ("hydrocracking"). In each of these processes, contaminants in the hydrocarbon feed may include polymerization sludge, corrosion products from upstream equipment such as iron sulfide, particles of carbon and metal, and various other by-products. For reasons that are well known in the art, it is desirable to remove these materials before the hydrocarbon feed undergoes hydrotreating or hydrocracking to avoid catalyst fouling, pore plugging and deactivation. Accordingly, a layer of filtration material according to the present invention is placed upstream of the hydrotreating or hydrocracking catalyst, either in the same vessel or in an upstream vessel, to trap contaminants that might cause reactor fouling or deactivation.

Particularly appropriate filtration materials for hydrotreating applications are a bed consisting of 30–50% 10 mesh filtration elements over 50–70% 25 mesh filtration elements. Both the 10 mesh and 25 mesh elements are preferably round with axial grooves about their circumference for reduced pressure drop. The filtration elements may have a zeolite structure for improved removal of water, hydrogen sulfide, hydrogen chloride, and other contaminants.

For resid hydrotreating, a particularly suitable configuration includes layers of (from top to bottom) 10 mesh, 25 mesh, and 50 mesh filtration elements. All three layers preferably include filtration elements with low pressure drop and high void fraction characteristics, for example octagonal elements or disk-shaped elements with axial grooves on the outer edge. The 50 mesh material is preferably macroporous alumina. Employing filtration elements with a maximum outer void allows for heavier loading of materials in the top section of the unit. Optionally, some or all of the filtration elements may be produced from alumina promoted with nickel/molybdenum to provide enhanced removal of metals, unsaturated materials, sulfur and nitrogen compounds. In a particularly preferred configuration, additional layers of smaller-diameter filtration elements are provided above the 10 mesh layer for improved flow distribution. A similar configuration is suitable for naphtha and gas oil hydrotreating, as well as for hydrocracking.

For diesel or kerosene hydrotreating, a particularly suitable configuration includes layers of (from top to bottom) 10 mesh, 25 mesh, and 50 mesh filtration elements. All three layers preferably include filtration elements with low pressure drop and high void fraction characteristics, for example octagonal elements or disk-shaped elements with axial grooves on the outer edge. The 50 mesh material is preferably macroporous alumina. Optionally, the filtration elements may be produced from alumina promoted with cobalt/molybdenum to provide enhanced hydrodesulfurization activity. In a particularly preferred configuration, an additional layer of smaller-diameter filtration elements is provided above the 10 mesh layer for improved flow distribution.

EXAMPLE 5

Protection of feed materials from contaminants that may cause fouling is particularly essential in operations that employ a fluidized catalyst bed, such as fluidized catalytic cracking. Accordingly, a layer of filtration material according to the present invention may be interposed upstream of the fluidized bed to trap such contaminants. A bed configuration similar to that described in example 4 above for resid hydrotreating is suitable for pre-treating the feed to a fluidized catalytic cracker, though the 50 mesh layer may be omitted if desired.

EXAMPLE 6

The Claus sulfur recovery process is a two-stage process for converting hydrogen sulfide (which is a refinery by-product) to elemental sulfur. While the first stage of the process is a thermal reaction that converts about two-thirds of the hydrogen sulfide, the second stage of the process employs a fixed-bed reactor ("Claus converter") with an alumina or titanium oxide catalyst, usually with down-flow of the feed through the bed. Accordingly, fine particles from upstream of the process can collect on and foul the catalyst bed unless they are removed from the process stream by filtration. Filtration materials according to the present invention are well suited for this application because a layer of such materials may be placed directly on top of the active catalyst bed within the reactor. Alternatively, the filtration may be accomplished in a separate vessel to permit replacement of used filtration material without affecting the active catalyst. The filtration elements are preferably macroporous alumina to provide improved trapping of 1–5 micron FeS particles.

EXAMPLE 7

A number of catalytic processes, particularly hydrogenation processes, are extremely sensitive to catalyst deactivation from hydrogen chloride and organic chlorides. Most such processes are equipped with chloride guard beds containing a chloride-absorbing material such as activated alumina, promoted alumina, or a chemical absorbent to remove any chlorides before the feed stream contacts the principal catalyst. Chloride guard beds are especially prone to fouling, partly because acidic alumina can catalyze oligomerization and polymerization of unsaturated feed materials. Fouling results in increased pressure drop and eventually degrades performance of the guard bed. This problem can be controlled by substituting filtration elements according to the present disclosure for the conventional alumina or other absorbent particles. The filtration elements may be produced from the same materials as the conventional adsorbents, allowing comparable chloride protection, but the channel structure of the present filtration elements permits significantly longer operation before fouling causes a substantial pressure drop across the bed. A particularly suitable filtration bed may contain 10-mesh, 25-mesh and 50-mesh elements (in that order). For this application, the filtration elements are preferably made of zeolite. The elements may incorporate axial grooves in their edges for reduced pressure drop.

EXAMPLE 8

In the process for making hydrogen from hydrocarbons, as well as the process for making ammonia from hydrogen and nitrogen, the hydrogen is usually generated by catalytic reforming of methane or other hydrocarbons and must be treated to remove carbon dioxide before it can be reacted with nitrogen. Carbon dioxide removal is usually accomplished by passing the hydrogen-containing gas through a scrubber containing a solution of diethanolamine or a similar amine that absorbs $CO_2$, followed by reaction of the residual $CO_2$ with some of the hydrogen to produce methane. Because carryover of the amine solution into the methanator interferes with the methanation catalyst, it is desirable to filter the methanator feed to remove any amine solution. Filtration materials according to the present invention may be placed on top of the methanator catalyst bed or in an upstream vessel to trap amine solution droplets before they reach the catalyst. A preferred configuration includes 30–50% of 10-mesh filtration elements over 50–70% of 25-mesh elements. Particularly preferred embodiments, the filtration elements have grooved outer edges to reduce pressure drop and/or are made of a zeolite for improved water removal.

EXAMPLE 9

Filtration elements according to the present invention may be used to significantly reduce the pressure drop in adsorbent beds relative to adsorbent particles of other shapes. For example, filtration elements according to the present disclosure may be fabricated of activated carbon, macroporous alumina, or a zeolite (molecular sieve). These materials are well known in the art as being highly suitable for removing contaminants of specific sizes and shapes from liquid or gas process streams. It is well known, however, that as the size of the adsorbent bed increases and as the duration on stream increases, the pressure drop across the adsorbent bed may rise significantly. Filtration elements according to the present disclosure may be used to replace all or part of the adsorbent in a purification bed. The unique shape of the filtration elements significantly reduces pressure drop relative to spherical or granular adsorbent particles. In one embodiment, a molecular sieve bed may be packed with 10-mesh and 25-mesh zeolite filtration elements according to the present disclosure.

Other applications and uses should be apparent to one of skill in the art.

While the apparatus, compositions and methods disclosed above have been described in terms of preferred or illustrative embodiments, it will be apparent to those of skill in the art that many variations may be applied to the process described herein without departing from the concept and scope of the claimed subject matter. All such similar substitutes and modifications apparent to those skilled in the art are deemed to be within the scope and concept of the subject matter as it is set out in the following claims.

What is claimed is:

1. A method of removing contaminants from a feed stream of a chemical reactor, comprising the steps of:
   (a) providing a plurality of discrete elements of a filtration material upstream of said chemical reactor, each said filtration element having substantially parallel first and second faces and a multi-cellular internal structure of substantially open and parallel channels extending through the filtration element from the first face to the second face; and (b) passing the feed stream through at least one layer of the filtration material, the layer of filtration material comprising a number of said filtration elements sufficient to filter the contaminant from the contaminated feed stream, provided that where said chemical reactor is a hydrotreating reactor, said feed stream is selected from the group consisting of atmospheric residuum, vacuum residuum, diesel oil, jet fuel, and kerosene.

2. The method of claim 1, wherein the substantially open and parallel channels have a polygonal cross-sectional shape, wherein the polygon is defined by internal angles not greater than 90 degrees.

3. The method of claim 2, wherein the substantially open and parallel channels have an acute angle polygonal cross-sectional shape.

4. The method of claim 3, wherein the substantially open and parallel channels have triangular cross-sections.

5. The method of claim 1, wherein the substantially open and parallel channels occupy from about 4 cells per linear inch to about 60 cells per linear inch.

6. The method of claim 1, wherein the filtration elements have an average outer diameter from about ½ inch to about 3 inches.

7. The method of claim 1, wherein the filtration elements have an average thickness of about ¼ inch to about 2 inches, said thickness being measured between the first and second faces.

8. The method of claim 1, wherein the filtration elements have a geometric surface area from about 25 to about 175 square inches.

9. The method of claim 1, wherein the filtration elements have an inner void fraction of about 60 percent to about 80 percent.

10. The method of claim 1, wherein the filtration material is composed of shaped material selected from the group consisting of alumina, silica, calcium aluminate, lanthanum aluminate, magnesium aluminate; zeolites, activated carbon and combinations thereof.

11. The method of claim 10, wherein the filtration material is an extruded ceramic material.

12. The method of claim 10, wherein the filtration material further comprises a catalytic material.

13. The method of claim 12, wherein the catalytic material is selected from the group consisting of transition metal oxides, transition metal sulfides, transition metal organometallic compounds; rare earth metal oxides, rare earth metal sulfides; and combinations thereof.

14. The method of claim 12, wherein the catalytic material comprises a metallic element selected from the group consisting of iron, cobalt, nickel, chromium, molybdenum, tungsten, ruthenium, rhodium, palladium, osmium, iridium, platinum, silver, gold, copper, zinc, calcium, potassium, and combinations thereof.

15. The method of claim 1, wherein the at least one layer of filtration material comprises a plurality of layers, at least two of said layers comprising filtration elements wherein the respective channels have different average cross-sectional areas.

16. A process comprising removing contaminants from a chemical reactor feed stream according to the method of claim 1 and then performing at least one chemical reaction on said feed stream.

17. A process according to claim 16, wherein said at least one chemical reaction comprises at least one reaction other than hydrotreating.

18. A method of removing contaminants from a process stream comprising contacting said process stream with a plurality of elements of a filtration material, said filtration elements having substantially parallel first and second faces and an outer wall, at least some of said filtration elements having a multi-cellular internal structure of substantially open and parallel channels extending from the first face to the second face thereof, said channels having a generally polygonal cross section comprising at least one angle of less than or equal to 90°, wherein said outer wall is shaped to increase outer void area relative to a comparable filtration element having a generally round and smooth outer wall.

19. A method according to claim 18, wherein said filtration elements have a generally round outer wall such that said filtration elements are substantially disk-shaped, said outer wall having a plurality of longitudinal grooves therein extending from the first face to the second face.

20. A method according to claim 18 wherein said outer wall is generally polygonal with about five to about ten sides.

21. A method according to claim 20 wherein said outer wall is generally octagonal.

22. The method of claim 18, wherein the substantially open and parallel channels occupy from about 4 cells per linear inch to about 60 cells per linear inch.

23. The method of claim 18, wherein the filtration elements have an average outer diameter from about ½ inch to about 3 inches.

24. The method of claim 18, wherein the filtration elements have a thickness of about ¼ inch to about 2 inches, said thickness being measured between the first and second faces.

25. The method of claim 18, wherein the filtration elements each have a geometric surface area from about 25 to about 175 square inches.

26. The method of claim 18, wherein the filtration material has an inner void fraction of about 60 percent to about 80 percent.

27. The method of claim 18, wherein the filtration material is composed of shaped material selected from the group consisting of: alumina, silica, calcium aluminate, lanthanum aluminate, magnesium aluminate; zeolite, activated carbon and combinations thereof.

28. The method of claim 27, wherein the filtration material is an extruded ceramic material.

29. A method according to claim 18 wherein said filtration elements comprise a catalytic material disposed thereon.

30. The method of claim 29, wherein the catalytic material is selected from the group consisting of transition metal oxides, transition metal sulfides, transition metal organometallic compounds; rare earth metal oxides, rare earth metal sulfides; and combinations thereof.

31. The method of claim 29, wherein the catalytic material comprises a metallic element selected from the group consisting of iron, cobalt, nickel, chromium, molybdenum, tungsten, ruthenium, rhodium, palladium, osmium, iridium, platinum, silver, gold, copper, zinc, calcium, potassium, and combinations thereof.

32. The method of claim 18, wherein the at least one layer of filtration material comprises a plurality of layers, at least two of said layers comprising filtration elements wherein the respective channels have different average cross-sectional areas.

33. A process comprising removing contaminants from a chemical reactor feed stream according to the method of claim 18 and then performing at least one chemical reaction on said feed stream.

34. A method of removing contaminants from a process stream comprising contacting said process stream with a plurality of elements of a filtration material, said filtration elements having substantially parallel first and second faces and an outer wall, at least some of said particles having a multi-cellular internal structure of substantially open and parallel channels extending from the first face to the second face thereof, said channels having a generally polygonal cross section comprising at least one angle of less than or equal to 90°, wherein said filtration elements comprise a macroporous material.

35. A method according to claim 34, wherein said macroporous material is a zeolite.

36. A method according to claim 34, wherein said macroporous material is macroporous alumina.

37. A method according to claim 34, further comprising a catalytic material disposed within macropores of said filtration elements.

38. The method of claim 37, wherein the catalytic material is selected from the group consisting of transition metal oxides, transition metal sulfides, transition metal organometallic compounds; rare earth metal oxides, rare earth metal sulfides; and combinations thereof.

39. The method of claim 37, wherein the catalytic material comprises a metallic element selected from the group consisting of iron, cobalt, nickel, chromium, molybdenum, tungsten, ruthenium, rhodium, palladium, osmium, iridium, platinum, silver, gold, copper, zinc, calcium, potassium, and combinations thereof.

40. The method of claim 34, wherein the substantially open and parallel channels occupy from about 4 cells per linear inch to about 60 cells per linear inch.

41. The method of claim 34, wherein the filtration elements have an average outer diameter from about ½ inch to about 2.5 inches.

42. The method of claim 34, wherein the filtration elements have an average thickness of about ¼ inch to about 2 inches, said thickness being measured between the first and second faces.

43. The method of claim 34, wherein the filtration elements have an average geometric surface area from about 25 to about 175 square inches.

44. The method of claim 34, wherein the filtration material has an inner void fraction of about 60 percent to about 80 percent.

45. The method of claim 34, wherein the at least one layer of filtration material comprises a plurality of layers, at least two of said layers comprising filtration elements wherein the respective channels have different average cross-sectional areas.

46. A process comprising removing contaminants from a chemical reactor feed stream according to the method of claim 34 and then performing at least one chemical reaction on said feed stream.

* * * * *